Patented Dec. 19, 1933

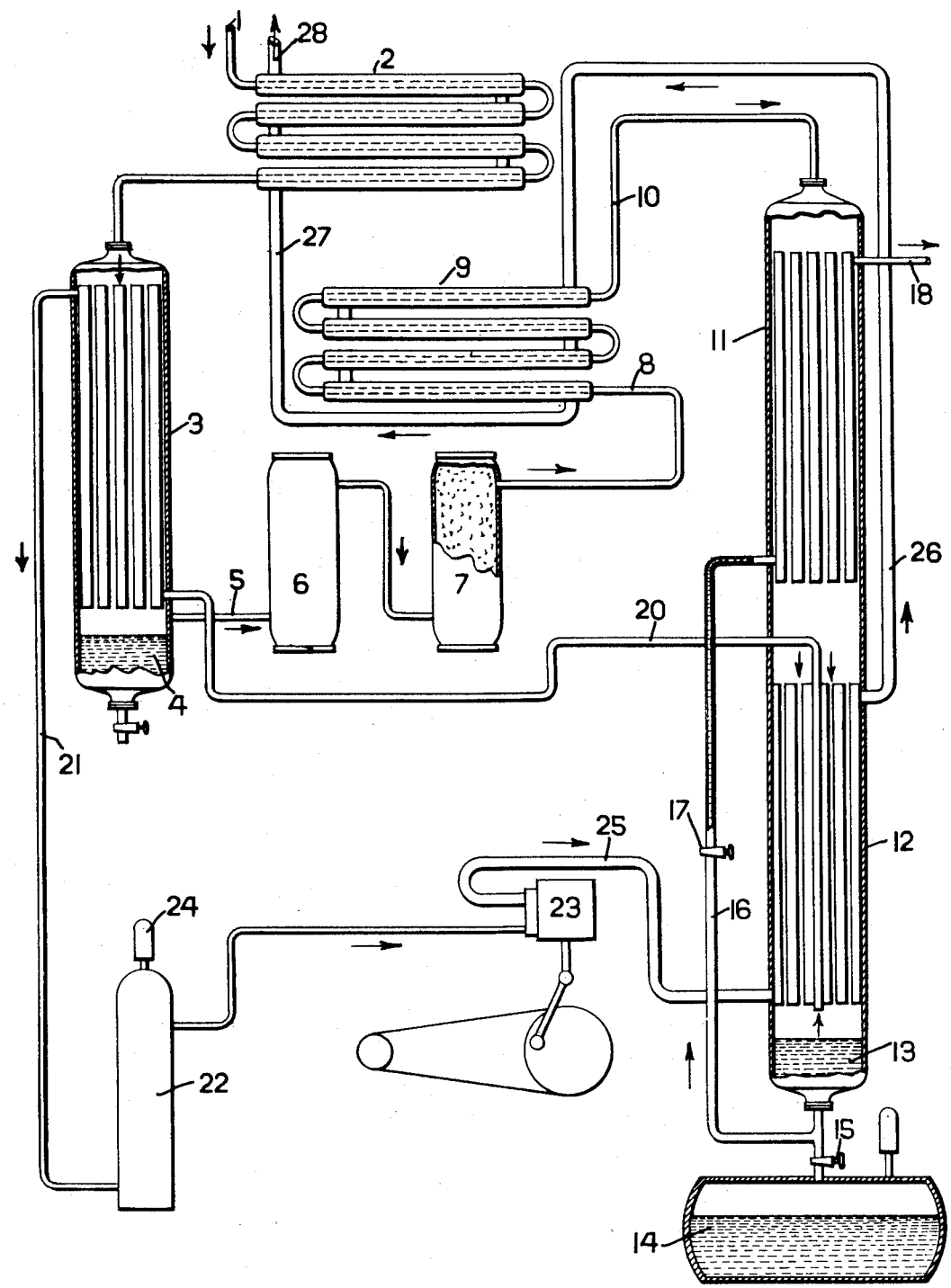

1,939,693

UNITED STATES PATENT OFFICE 1,939,693

PROCESS OF SEPARATING GASES

Rudolph Leonard Hasche, Elizabeth, N. J., assignor to American Smelting and Refining Company, New York, N. Y., a corporation of New Jersey Application April 4, 1928, Serial No. 267,221
Renewed April 15, 1933

6 Claims. (Cl. 183—115)

This invention relates to the separation of gases, and more particularly to a process of separating and recovering sulphur dioxide from a mixture of furnace gases by refrigeration and liquefaction under pressure.

In accordance with the present invention the furnace gases after being suitably cleaned and compressed are cooled to eliminate the moisture content and subsequently further cooled to a degree sufficient to liquefy the sulphur dioxide and separate the same from the remaining gases which remain throughout in a gaseous state. The heat of vaporization of sulphur dioxide is returned to the system to supply a portion of the cooling medium for refrigeration. The major part of the refrigeration is obtained by expanding compressed, stripped gases in an expanding engine and there is also recovered in this operation a part of the original work of compression which may be utilized for driving any desired pieces of apparatus. By a suitable arrangement of heat exchangers the refrigerating properties contained in the various gases by virtue of their sensible heat are retained within the system.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which the figure is a diagrammatic representation of an arrangement of apparatus for effecting the various steps of the process.

The process in general comprises purifying and compressing the smelter gases for the elimination of materials which would interfere with the subsequent operation of the process, and cooling the mixture to a temperature sufficiently low to condense a large portion of the moisture. The gases are then further dried by suitable driers and cooled while still under pressure to a temperature at which the sulphur dioxide becomes liquid, as, for example, a temperature of —70° C. The liquid sulphur dioxide is then vaporized and utilized as a cooling medium for certain of the steps prior to its final recovery.

The stripped gases, freed from the sulphur dioxide, are also utilized as a cooling medium and may be caused to absorb heat until their temperature approaches atmospheric. In this condition they are applied to an expansion engine and allowed to expand from their initial high pressure down to a pressure slightly above atmospheric. The act of expansion further cools these gases and they are then passed through the heat exchange devices and assist in the various steps of cooling, after which they are vented into the atmosphere.

Referring to the process more in detail, the mixture of smelter gases passes through a suitable cleaning system, such as a plurality of bag filters, and is cooled to approximately atmospheric temperature in suitable water cooling devices. The gas is then compressed to a comparatively high pressure, such as 15 atmospheres, and is passed through water cooled coils to remove the heat of compression and thence into suitable separators, such as the well known centrifugal separators, for eliminating the moisture condensed as a result of the compression, and any oil which may have carried over mechanically.

After being prepared as above, the gases may be passed through cooling coils to remove any heat which may have been absorbed in the separating mechanism, and then through a heat exchanger in which they are cooled to substantially 0° C. at which temperature a large portion of the moisture is condensed and may be collected by suitable means.

In order to eliminate the remaining traces of moisture, the gases may then be passed through driers, as, for example, towers filled with calcium chloride, a suitable number being employed to remove further traces of moisture, the number depending upon the particular condition obtained. On leaving the driers the gases are passed through cooling coils to remove heat which has previously been absorbed, and are passed to a heat exchanger in which they are cooled to a comparatively low temperature, as for example, —15° C. It has been found that about 15% of the sulphur dioxide in the incoming gases is condensed in this exchanger, and may be recovered in liquid form.

A further quantity of sulphur dioxide is condensed in a third heat exchanger, which may be placed directly below the second exchanger for the purpose of heat economy, wherein the gas is cooled to a temperature of approximately —70° C., at which temperature more than 90% of the sulphur dioxide will become condensed. Obviously the exact temperatures employed will depend upon the initial quantity of sulphur dioxide present in the furnace gases and upon the completeness with which it is desired to recover the same.

The liquid sulphur dioxide may be passed to the second heat exchanger and evaporated therein for furnishing the cooling medium, and withdrawn to a suitable compressor by means of which it is compressed and stored for subsequent use. The suction produced by the compressor will normally be sufficient to cause vaporization at a temperature below —10° C., the boiling point of sulphur dioxide.

The stripped gases from the third heat exchanger which are of approximately the temperature thereof, or namely —70° C., are passed through the first heat exchanger and serve as a cooling medium therefor. The gases are then applied to an expansion engine and expanded adiabatically from an initial pressure of approximately 15 atmospheres to a pressure of approximately one atmosphere. The expanding engine may be used to run a compressor to compress fresh quantities of the purified smelter gases, or to compress the sulphur dioxide, or may be used to furnish power for other purposes.

The gas leaving the expanding engine is at a temperature below —100° C., and is passed through the jacket of the third heat exchanger and thence to the two sets of cooling coils, one following the calcium chloride driers, and the second set preceding the first heat exchanger, after which it is vented into the atmosphere.

In this process the sensible and latent heat separated from the gases in the liquefaction of the sulphur dioxide has been returned to the system, and a large proportion of the work of compression is recovered in the expansion engine. It is obvious, therefore, that the process may be carried on continuously by the application of a minimum amount of power.

In the drawing forming a part of the present application, an apparatus has been shown in which the various steps thereof may be carried out. Referring more particularly to that drawing, the smelter gases, after being subjected to suitable cleaning treatment and being compressed preferably to between 200 and 300 lbs. and cooled to atmospheric temperature, enter pipe 1 and pass through gas heat exchanger 2 and tube heat exchanger 3, wherein they are cooled to a temperature of approximately 0° C. and moisture collected as at 4 at the bottom of said heat exchanger. The gases are then passed through pipe 5 into suitable driers 6 and 7 which may contain calcium chloride or other suitable drying medium.

The gases, after passing through driers 6 and 7, in which the moisture has been completely removed, are passed through pipe 8 into gas heat exchanger 9, thence through pipe 10 into tube heat exchanger 11, wherein they are cooled to approximately —15° C., thence the gases pass to heat exchanger 12 which may be placed directly under exchanger 11 and are cooled to the desired point, as for example, —70° C. while still under the above mentioned high pressure.

The liquid sulphur dioxide is then recovered as at 13 at the bottom of heat exchanger 12, and a portion thereof may be withdrawn into tank 14 to provide a reserve for cooling the heat exchangers when a sufficient amount of sulphur dioxide is not present in exchanger 12, as for example, in starting the process. Valve 15 may be employed to control the passage of sulphur dioxide to tank 14.

Sulphur dioxide from the bottom of heat exchanger 12 is passed through pipe 16, controlled by valve 17, into heat exchanger 11 and is there vaporized for furnishing the cooling medium for said heat exchanger. The vaporized sulphur dioxide is then withdrawn through pipe 18 to a suitable compressor (not shown) which delivers it in liquid condition to storage tanks.

The stripped gases from exchanger 12 which are at a comparatively low temperature, such as —70° C., are removed upwardly through pipe 20 and applied to exchanger 3 for cooling the incoming gases. After passing through exchanger 3 they are removed through pipe 21, passed through reservoir 22 and applied to expansion engine 23. Valve 24 on reservoir 22 is used for regulating the pressure of the entire system, and in the example given above, would be set at slightly above 15 atmospheres.

The gases are expanded in engine 23 to approximately one atmosphere and are thereby cooled to a temperature somewhat less than —100° C. They are then passed through pipe 25 and applied to heat exchanger 12 for cooling the sulphur dioxide gases to the liquefying point, as above mentioned. After passing through exchanger 12 they are withdrawn through pipe 26 and applied to gas exchanger 9, thence through pipe 27 to gas exchanger 2, thence through pipe 28 to the atmosphere.

By means of the above described process and apparatus, sulphur dioxide gases may be readily removed from furnace gas without the use of adsorption or desorption methods, and are recovered solely by the selective liquefaction. The efficiency of the process is maintained high by utilizing the cool gases at the various stages as a cooling medium for the different heat exchangers and also by applying the highly compressed gases to an expansion engine for recovering further quantities of power. The expansion engine not only serves to produce power, but also cools the gases to a sufficient degree to enable them to operate certain of the heat exchangers before being vented to the atmosphere.

By cooling the gases in various stages, the moisture is condensed and removed separately and prevented from subsequently interfering with the removal of the sulphur dioxide. The total number and size of driers depends upon the various materials used and the requirements of the particular case. The figures mentioned above are suitable for separating sulphur dioxide from smelter gases in which the content thereof is approximately 10% by volume. Obviously for other proportions of sulphur dioxide in the gas the temperatures and pressures would be correspondingly changed. This may be effectively accomplished by means of control valve 24.

A process has been disclosed for ease of description as applied particularly to smelter gases, but it is obviously capable of being applied to the separation of other gases from other combinations, thereof, and is not intended to be limited to the specific elements mentioned in the description.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of recovering sulphur dioxide from furnace gases which comprises compressing said gases, cooling said compressed gases to approximately atmospheric temperature to remove moisture and other impurities therefrom, further cooling said gases, whereby a large proportion of the remaining moisture is condensed, cooling said gases in a plurality of stages to a temperature at which the desired quantity of sulphur dioxide is liquefied, removing said sulphur dioxide from contact with the stripped gases at said temperature, vaporizing the liquid sulphur dioxide and utilizing the evaporating liquid as a cooling medium for one of said stages, withdrawing the stripped gases from the liquid sulphur dioxide, utilizing the same for cooling further quantities of incoming gases, expanding the stripped gases to slightly above atmospheric pressure, and utilizing the expanded gases as a heat exchange medium for furnishing the final cooling of the incoming gases, and venting said expanded stripped gases to the atmosphere.

2. The process of recovering sulphur dioxide from furnace gases which comprises compressing said gases, removing moisture and other impurities from said compressed gases, cooling the same to approximately 0° C. whereby a large portion of the remaining moisture is condensed, removing the remainder of said moisture, cooling said gases in a plurality of stages to a temperature of approximately —70° C., whereby sulphur dioxide is liquefied, removing said sulphur dioxide from contact with the stripped gases at approximately —70° C., vaporizing the liquid sulphur dioxide and utilizing the evaporating liquid as a cooling medium for one of said stages, withdrawing and recovering said vaporized sulphur dioxide, withdrawing the stripped gases from the liquid sulphur dioxide, utilizing the same for cooling further quantities of incoming gases to approximately 0° C., expanding the stripped gases to slightly above atmospheric pressure, recovering work therefrom while expanding, utilizing the expanded gases as a heat exchange medium for furnishing the final cooling of the incoming gases, and further utilizing said expanded gases for cooling the incoming gases during the initial stages of the process, and venting said expanded stripped gases to the atmosphere.

3. The process of recovering sulphur dioxide from furnace gases which comprises compressing said gases to approximately 15 atmospheres, cooling said compression gases to approximately atmospheric temperature, removing moisture and other impurities therefrom, cooling the same to approximately 0° C. whereby a large proportion of the remaining moisture is condensed, subsequently cooling said gases in a plurality of stages to a temperature of —70° C. whereby sulphur dioxide is liquefied, removing the sulphur dioxide from contact with the stripped gases at said temperature, vaporizing the liquid sulphur dioxide and utilizing the evaporating liquid as a cooling medium for one of said stages, withdrawing and recovering said vaporized sulphur dioxide, withdrawing the stripped gases from the liquid sulphur dioxide, utilizing the same for cooling further quantities of incoming gases expanding the stripped gases to slightly above atmospheric pressure, and utilizing the expanded gases as a heat exchange medium, and venting said expanded stripped gases to the atmosphere.

4. The process of recovering sulphur dioxide from furnace gases which comprises removing impurities therefrom, compressing said gases to approximately 15 atmospheres, cooling said compressed gases to approximately atmospheric temperature to remove moisture and other impurities therefrom, cooling the same to approximately 0° C. whereby a large proportion of the remaining moisture is condensed, removing the remainder of said moisture, subsequently cooling said gases to a temperature at which the sulphur dioxide is liquefied removing the sulphur dioxide from contact with the stripped gases at said temperature, vaporizing the liquid sulphur dioxide and utilizing the evaporating liquid as a cooling medium, withdrawing and recovering said vaporized sulphur dioxide, withdrawing the stripped gases from the liquid sulphur dioxide, utilizing the same for cooling further quantities of incoming gases, expanding the stripped gases to slightly above atmospheric pressure, and utilizing the expanded gases as a heat exchange medium for cooling the incoming gases, and venting said expanded stripped gases to the atmosphere.

5. The process of recovering sulphur dioxide from furnace gases which comprises removing impurities therefrom, compressing said gases to approximately 15 atmospheres, cooling said compression gases to approximately atmospheric temperature to remove moisture and other impurities therefrom, cooling the same to appproximately 0° C. whereby a large proportion of the remaining moisture is condensed, passing said gases through calcium chloride for removing the remainder of said moisture, subsequently passing said gases through a heat exchanger for removing a portion of the heat thereof and cooling said gases in a plurality of stages to a temperature at which the desired quantity of sulphur dioxide is liquefied, removing the sulphur dioxide from contact with the stripped gases at said temperature, vaporizing the liquid sulphur dioxide and utilizing the evaporating liquid as a cooling medium for one of said stages, withdrawing and recovering said sulphur dioxide, withdrawing the stripped gases from the liquid sulphur dioxide, utilizing the same for cooling further quantities of incoming gases to approximately 0° C., expanding the stripped gases to slightly above atmospheric pressure, recovering work therefrom while expanding, utilizing the expanded gases as a heat exchange medium for furnishing the final cooling of the incoming gases, further utilizing said expanded gases for cooling the incoming gases during the initial stages of the process, and venting said expanded stripped gases to the atmosphere.

6. The process of removing a gas from a gas mixture by selective liquefaction which comprises cooling said mixture in three stages to a temperature at which a substantial quantity of said gas is liquefied, removing said liquid from contact with the stripped gases at said temperature, utilizing the stripped gases as a refrigerant in the first stage of cooling whereby said gases are heated therein, expanding said heated gases with the production of external work whereby said gases are cooled to a low temperature and utilizing said cooled gases in the third stage of cooling, vaporizing the liquid constituent and utilizing the evaporating liquid as a refrigerant in the second stage of cooling.

RUDOLPH LEONARD HASCHE.